Nov. 21, 1939.     H. V. KING     2,180,811
LIQUID SEPARATOR
Filed May 5, 1938
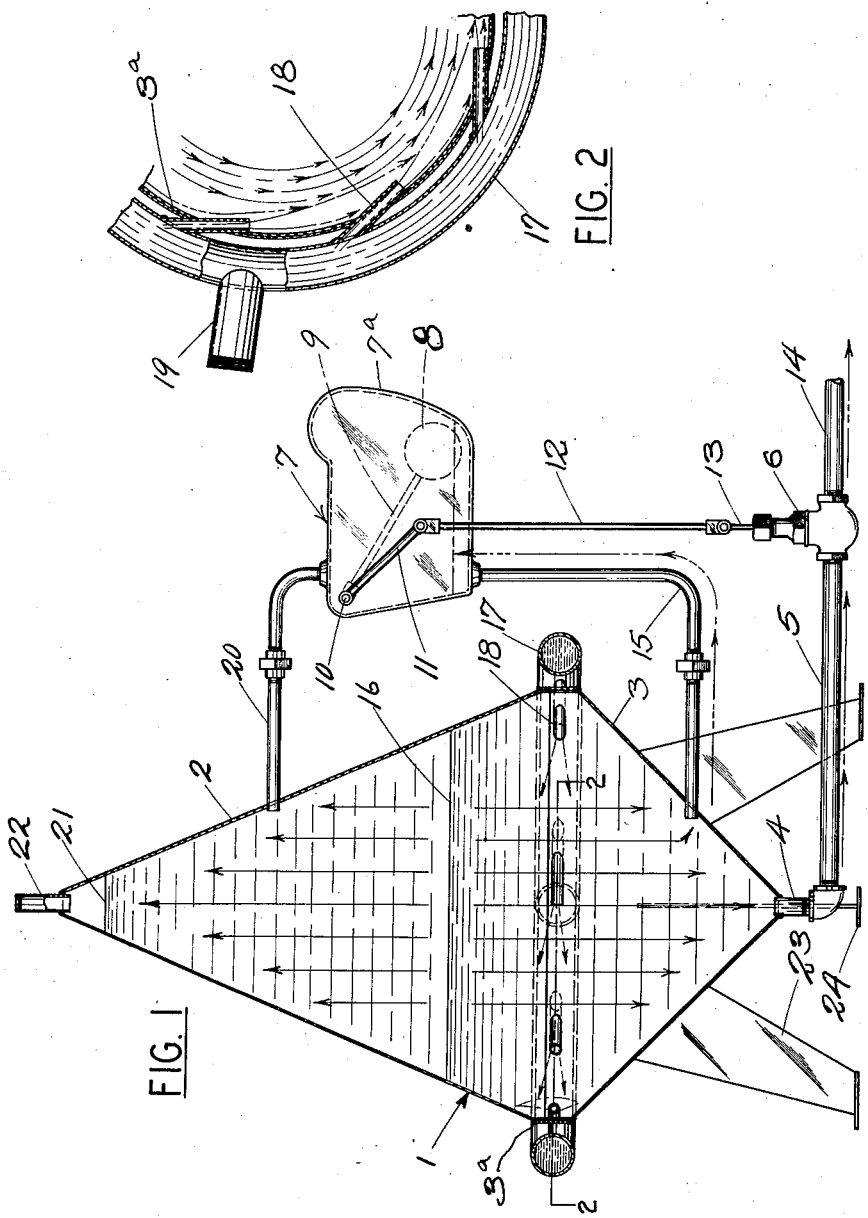
INVENTOR
H. V. King
Watson E. Coleman
ATTORNEY Patented Nov. 21, 1939

2,180,811

UNITED STATES PATENT OFFICE 2,180,811

LIQUID SEPARATOR

Henry V. King, Shawnee, Okla.

Application May 5, 1938, Serial No. 206,288

2 Claims. (Cl. 210—54)

This invention relates to the class of separators and pertains particularly to improvements in liquid separators.

The present invention has for its primary object to provide an improved liquid separator which involves centrifugal action to effect separation of liquids of different specific gravities and which includes a novel means for automatically and periodically removing the liquid of heavier gravity from a receptacle in which the separation takes place.

Another object of the invention is to provide an improved centrifugal separator which is designed primarily to effect the separation of oil and water which occurs in emulsified form in oil well operation and which separator is designed to be connected in the oil line of an oil well so that separation of the water from the oil may be accomplished automatically with the operation of the well.

A further and more specific object of the invention is to provide a centrifugal separator of the character above described wherein the effects of frictional contact of the emulsified fluid with the circular wall of the separator is employed for breaking the emulsion and producing a coalescence of the water and oil globules so that a quick separation of the oil and water is obtained.

Still another object of the invention is to provide a centrifugal separator for oil and water mixtures which is of novel design whereby the forced expulsion of the lighter of the fluids is obtained as the quantity of the heavier fluid increases in the separator structure and whereby the increase in quantity of the heavier fluid brings about an automatic opening of a discharge port therefor so that while the separatory process is automatic in its operation, the flow of the separated fluids from the separator will occur intermittently.

A still further object of the invention is to provide a fluid separator for fluids of different specific gravities, in which a novel means is employed for opening and closing a relief valve whereby the heavier of the fluids may flow off by gravity, said valve opening and closing means being in the form of a float mounted in a chamber separate from the separator structure but connected therewith in such a manner that the float which is connected with a control valve, will rise and fall with the rise and fall of the level of the heavier fluid in the separator so as to accomplish the opening and closing of the drain controlling valve for the heavier fluid.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Fig. 1 is a view in vertical section through the separator embodying the present invention.

Fig. 2 is a fragmentary sectional view taken on the line 2—2 of Fig. 1.

Referring now more particularly to the drawing, the numeral 1 designates as a whole, the separator body which as shown is in the form of a tank made up of the upper and lower sections 2 and 3, respectively, which are of conical formation, the upper conical section 2 being of greater length than the lower section and inverted so that the bell ends of the sections may be brought into the proper relation to be coupled together to form the closed tank. These bell ends of the conical sections of the tank are formed to provide the short straight portions 3ª which are in overlapping relation, as illustrated, and are secured together in any suitable manner as by welding or the like. The separatory tank is thus provided with a waist portion of maximum diameter and the wall of the receptacle tapers from this waist portion to the top and bottom apices of the cone sections.

At the apex of the lower cone section 3, an outlet nipple 4 is connected which joins a laterally extending lead-off pipe 5 which is connected with one side of a valve 6. This valve may be of any suitable type such as a butterfly type or a gate type, the principal requirement of the valve being that it be of a type which can be quickly opened and closed.

The numeral 7 generally designates a control unit for the valve 6 and comprises a casing 7ª for a float ball 8 which is attached to a carrying rod 9 which in turn is connected to the supporting shaft 10 which extends transversely within the casing 7ª. To this shaft 10 is connected, exterior of the casing 7ª, an arm 11, the free or movable end of which is pivotally attached to a link rod 12, which in turn is coupled with the stem 13 of the valve 6. Thus it will be seen that as the float 8 rises and falls within the casing 7ª, the valve stem 13 will be actuated to open and close the valve 6 and the construction and arrangement of the valve 6 and its control stem 13 is such that when the float 8 is in its lowermost position, the valve 6 will be closed and will, of course, be opened upon the raising of the float.

The other side of the valve 6 is coupled with a lead-off pipe 14 so that when the valve 6 is open, the heavy fluid in the lower portion 3 of the separator will be carried off to a disposal point.

Connected with the lower part of the separator and extending through the wall of the portion 3 thereof as shown, is one end of a fluid pipe line 15, the other end of which opens into the float casing 7ᵃ through the bottom thereof as illustrated. By the provision of this pipe line 15 and the disposition of the float casing 7ᵃ at approximately the transverse center of the separator tank, it will be seen that a level of heavy fluid will be maintained in the lower part of the casing 7ᵃ at the same height as the level of such fluid in the lower portion 3 of the separator, such level being here shown as at its low point and indicated by the numeral 16.

Encircling the waist portion of the separator tank is a tubular ring 17 which may be referred to for brevity as a header ring and this ring is supported from the wall of the tank and has extending from the inner side thereof a plurality of discharge tubes or nozzles 18 which pass through the waist of the separator tank in a tangential direction relative thereto, all of the nozzles being arranged to discharge into the tank in the same direction as shown in Fig. 2, so that fluid passing from the header ring 17 through the nozzles will set up a whirling movement in the body of liquid in the tank. This header ring 17 is provided with an inlet connection 19 by which the pipe line leading from the oil well may be connected with the ring so that the oil and water mixture flowing from the well will pass directly into the header of the ring and from there through the nozzles 18 into the tank.

The float casing 7ᵃ has a vent pipe 20 extending from its top wall through the wall of the upper conical portion 2, and in this upper portion the lighter of the two fluids will collect upon the heavy fluid, as shown, the normal level for the lighter fluid being at approximately the line indicated at 21, and when the quantity of the lighter fluid increases, it will pass out through the apex of the portion 2 through the outlet 22.

Any suitable means may be provided for supporting the tank of the separator such as the legs 23 having the floor or ground engaging feet 24. In operation, the oil and water mixture, as previously stated, will enter the header ring 17 directly from the well or other source of supply through the inlet 19 and will be discharged tangentially into the double conical tank through the nozzles 18, setting up, after the tank has become filled with liquid, a whirling motion of the liquid therein. As the mixed oil and water flows in a circular path in the tank, the centrifugal action of the rotary motion will cause the heavier liquid or the water to move outwardly from the lighter liquid or oil, and due to this action and the frictional effect of the water against the wall of the conical lower portion 3 into which the water will settle, the water globules will coalesce and will be effectively separated from the oil. As the water level 16 rises in the separator tank, it will also rise in the float casing 7ᵃ, and when the float has been raised a sufficient distance, the valve 6 will be opened and the water or heavier liquid will flow off through the pipe 14. It will be readily apparent that as the water rises, it will lift the body of oil lying thereover and this action together with the fact that the oil coming into the separator with the water is being constantly separated from the water, will cause the oil to be forced out through the apex of the conical portion 2 by way of the pipe line 22. Thus it will be seen that the action of the separator, so far as discharge of the heavier and lighter liquids is concerned, is fully automatic and is dependent for its action only upon the continuous supplying of the liquids thereto through the header ring 17.

In addition to the operation of separating the light and heavy fluids, the present separator structure will also function to remove solid matter from the emulsion which enters the separator through the ring 17 and nozzles 18. It will be readily obvious that such heavy materials or solids upon entering the separator would to a certain extent gravitate naturally into the lower portion 3 and this separation will be accelerated by centrifugal action due to the rotary movement of the fluids. The settled solids may then be drawn off through the pipe line 14 with the heavier fluid.

What is claimed is:

1. A separator for liquids of different specific gravities, comprising a receptacle having a waist portion of maximum diameter and tapering from said waist portion upwardly and downwardly to form oppositely disposed apices, an outlet in each of said apices, means for injecting mixed fluids into the receptacle at a plurality of points about said waist portion and tangentially to the wall of the receptacle whereby fluid in the receptacle will be caused to have a whirling motion, valve means controlling the passage of fluid from the lower apex, a float casing at an elevation above the waist portion, a pipe line connecting said casing with the receptacle below the waist portion whereby fluid contained in the lower portion of the receptacle will rise in said casing, a float in said casing, said casing having a top vent having communication with the interior of the receptacle above the waist thereof, and connecting means between said float and said valve whereby rise of fluid in the casing will effect the actuation of said valve for the discharge of fluid of heavier gravity from the receptacle.

2. A separator for liquids of different specific gravities, comprising a tank of circular cross-section having a waist portion of maximum diameter and tapering from the waist portion upwardly and downwardly to form two connected cone portions, an outlet for heavy gravity fluid at the apex of the lower cone portion, an outlet for lighter gravity fluid at the apex of the upper cone portion, a tubular ring encircling said waist, means for discharging mixed fluids into said ring, a plurality of nozzles leading from said ring tangentially through the wall of the tank, said nozzles being all arranged to discharge in the same direction within the tank in the area of the waist, a valve controlling the flow of heavy gravity fluid from the lower cone portion of the tank, a casing disposed at the side of the tank above the plane of said waist, a pipe line forming a fluid communicating passage between the lower part of the tank below the waist portion and the lower part of said casing, a float pivotally supported within the casing to be raised and lowered by the rise and fall of fluid level therein, a pipe line leading from the top of the casing into the tank above said waist, and coupling means between the pivotal support for the float and said valve whereby the discharge outlet of the lower conical portion will be opened upon the rise of heavy gravity fluid in the tank to a predetermined level.

HENRY V. KING.